United States Patent [19]
Ancona

[11] Patent Number: 5,770,239
[45] Date of Patent: Jun. 23, 1998

[54] MACHINE FOR DOMESTIC USE FOR MAKING, CUTTING AND SHAPING PASTA

[75] Inventor: Enrico Ancona, Turin, Italy

[73] Assignee: Imperia Trading s.r.l., Rome, Italy

[21] Appl. No.: 788,264

[22] Filed: Jan. 24, 1997

[30]     Foreign Application Priority Data

Jul. 26, 1996 [IT] Italy ................... TO96U0163

[51] Int. Cl.⁶ ............ A21C 3/04; A21C 11/16; B29B 1/06; B01F 7/18
[52] U.S. Cl. ............. 425/190; 99/348; 99/353; 366/91; 366/97; 366/309; 366/329.1; 425/191; 425/197; 425/205
[58] Field of Search ............ 99/348, 352–355, 99/357, 407, 484; 366/97–99, 69, 91, 205, 314, 77, 80, 92, 309–311, 329.1; 425/190, 197, 204, 205, 337, 366, 373; 426/297, 497, 501; D7/376, 368

[56]          References Cited

U.S. PATENT DOCUMENTS

| | | | |
|---|---|---|---|
| 4,083,668 | 4/1978 | Bardwick, III et al. | 425/194 |
| 4,269,582 | 5/1981 | Mella | 366/91 X |
| 4,675,199 | 6/1987 | Hsu | 426/557 |
| 4,842,879 | 6/1989 | Ek | 426/297 |
| 4,971,546 | 11/1990 | Cimenti | 426/502 X |
| 5,216,946 | 6/1993 | Huang et al. | 99/353 |
| 5,304,055 | 4/1994 | Van Lengerich et al. | 425/225 |
| 5,364,651 | 11/1994 | Manser et al. | 99/483 X |
| 5,375,509 | 12/1994 | Taylor et al. | 99/353 |
| 5,384,142 | 1/1995 | Henson | 426/502 |
| 5,401,159 | 3/1995 | Hsu | 425/190 |
| 5,460,506 | 10/1995 | Price, IV et al. | 425/205 X |
| 5,486,100 | 1/1996 | Hsu | 99/348 X |

*Primary Examiner*—Timothy F. Simone
*Attorney, Agent, or Firm*—Keil & Weinkauf

[57]          ABSTRACT

The invention concerns a machine for making, cutting and shaping pasta, including at least one unit head for making, cutting or shaping pasta, in which is installed at least one pair of rollers, adjacent to each other and rotating around their respective substantially horizontal and parallel axes; it is equipped to process dough into sheet form or a sheet in the form of pasta, including, according to the invention, a hopper detachably fastened to the unit head to feed dough composed of flour and eggs or a sheet of pasta into the unit, this being without manual intervention of the operator after the introduction of the dough or sheet of pasta between the rollers in the unit head.

5 Claims, 5 Drawing Sheets

MACHINE FOR DOMESTIC USE FOR MAKING, CUTTING AND SHAPING PASTA

BACKGROUND OF THE INVENTION

The present invention concerns a machine for domestic use for making, cutting and shaping pasta.

DESCRIPTION OF THE PRIOR ART

Known machines of this type have a unit for shaping pasta sheets in which two smooth-surfaced rollers are mounted adjacent to each other and rotating around their respective substantially horizontal and parallel axes in a housing attached, for example, to a supporting surface on a table or the like.

The shaping rollers are made to rotate simultaneously and in opposite directions manually or by motor, and between them dough composed of flour and eggs is made to pass, which is thus flattened out and formed into sheets.

Further, in another part of the same machine the subsequent operations of cutting and/or shaping the pasta take place beginning with the pasta sheet, which is manually fed into and made to pass between another pair of rollers, which, however, have molded surfaces and are supported adjacent to each other within the unit itself and are caused, manually or by motor, to rotate around their substantially horizontal and parallel axes and are made to rotate simultaneously and in opposite directions.

On the other hand, the pasta sheet or dough still has to be held manually while passing through the rollers that have shaped or cut it, in order for it to be placed gently on a support, for example on a tray, immediately under the rollers. Otherwise the pasta sheet or dough, falling in folds at least partly onto that support, piles up and loses the form given it during the previous process.

This disadvantage can be partially avoided in motor-operated machines since both of the operator's hands are free and can thus both feed the dough or the sheet into the rollers that are to process it, and also extract the sheet or the pasta from the rollers after they have processed it.

However, in a manually operated machine the operator has to turn continuously with one hand by means of a crank handle the rollers of the shaping or cutting unit, while with the other hand the operator feeds the dough or the sheet between the same rollers. This method of operating with a manually operated, conventional machine of this type is illustrated by way of example in FIG. 1 of the attached drawings.

SUMMARY OF THE INVENTION

The present invention addresses the disadvantage described above and proposes to remedy it.

In particular, the principal purpose of the present invention is to provide a machine for domestic use for making, cutting and shaping pasta in which the pasta sheet that is formed into shapes or into cut pasta can be manually extracted by an operator from the rollers that have processed it, arranging its correct placement on a support immediately under the rollers, even if the rotation of the rollers is performed manually by the operator.

Another purpose is to provide in a machine as specified the means of feeding the dough or the pasta sheet between the rollers for shaping or cutting which are of simplified structure, of safe and reliable functioning and of easy and convenient maintenance.

In view of these purposes, the present invention provides a machine for domestic use for making, cutting and shaping pasta, whose essential characteristic forms the object of the principal claim, which is intended to be described here in full.

Further advantageous characteristics form the object of subordinate claims, which are also intended to be described here in full.

BRIEF DESCRIPTION OF THE DRAWINGS

The present invention is described in detail in the following, with reference to enclosed drawings, furnished only by way of nonlimiting example, in which.

DESCRIPTION OF THE PREFERRED EMBODIMENTS

With reference to FIGS. 2 through 7 of the enclosed drawings, 10 indicates in its entirety the machine for domestic use for making, cutting and shaping pasta, according to one embodiment of the present invention.

This machine 10 includes, in a known way, a housing 11, of plate, in which two unit heads, that is, one unit 12 in the shape of a pasta sheet, for example, beginning with a flour and egg dough, and another unit 13 for cutting the sheet into strips in the form of noodles or the like.

Figure 7:
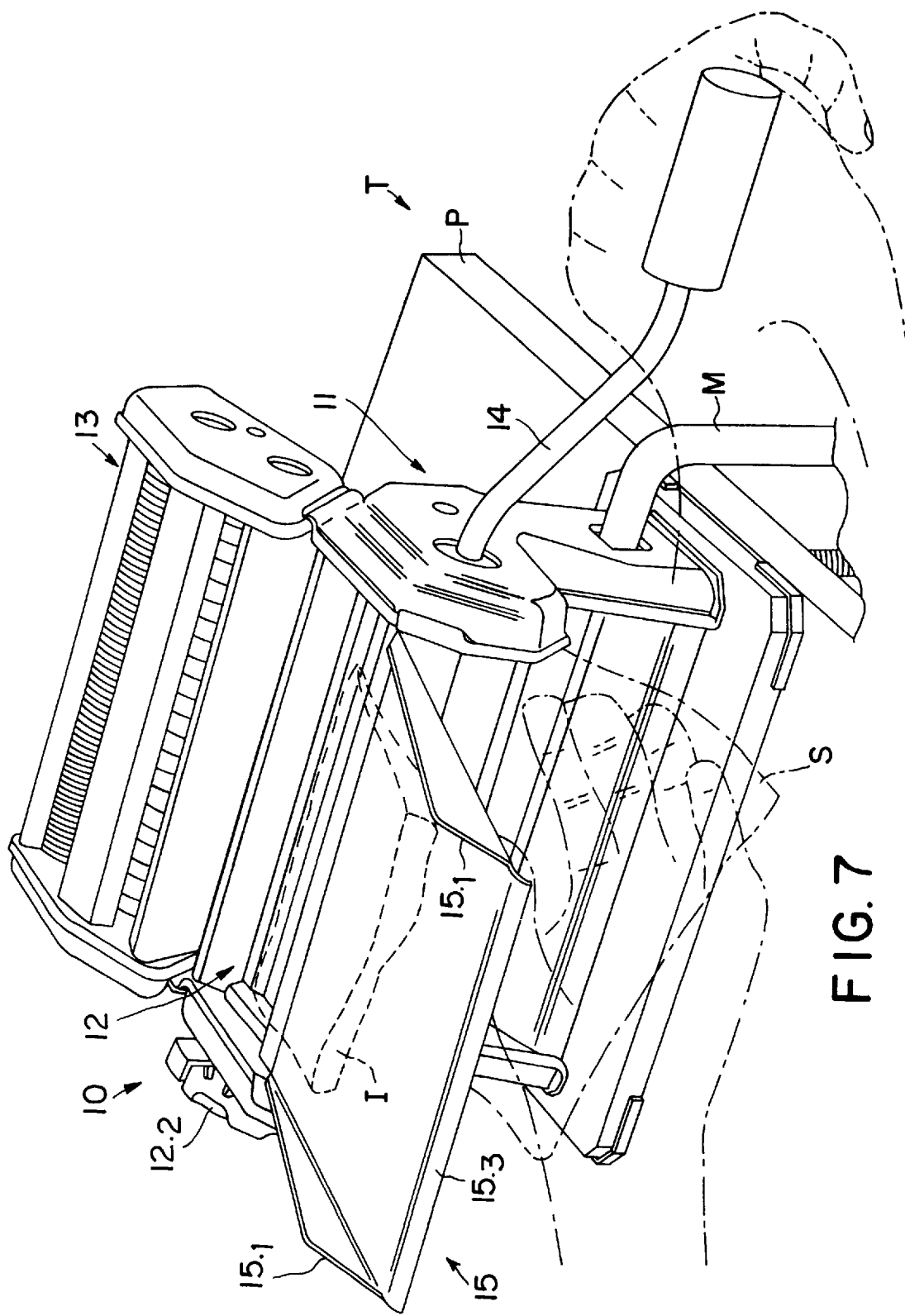
FIG. 7 is a view similar to that of FIG. 1, but illustrating the machine according to the present invention during the fabrication of a sheet of pasta.

The housing 11 is detachably fastened with fasteners M to plane P, for example a table T (FIG. 7).

In the shaping unit 12 there is a pair of adjacent shaping rollers 12.1 with parallel horizontal axes having smooth surfaces. These rollers 12.1 are controlled simultaneously in rotation in opposite directions (by a crank handle, FIG. 7, inserted in the apposite seat of a releasable clutch 14.1, FIG. 4) for flattening the dough composed of flour and eggs into a sheet, which is fed into and made to pass through the rollers. A control device operated by a rotating knob 12.2 permits selective variation of the space between these rollers 12.1 in order to vary the thickness of the pasta sheet thus obtained.

In the cutting unit 13, however, there are two pairs of rollers adjacent to each other, respectively 13.1 and 13.2 (FIG. 5), differently arranged in the form of rotating opposing knives for cutting a pasta sheet into strips of differing widths, producing more or less narrow pasta ribbons in the form of noodles.

Figure 1:
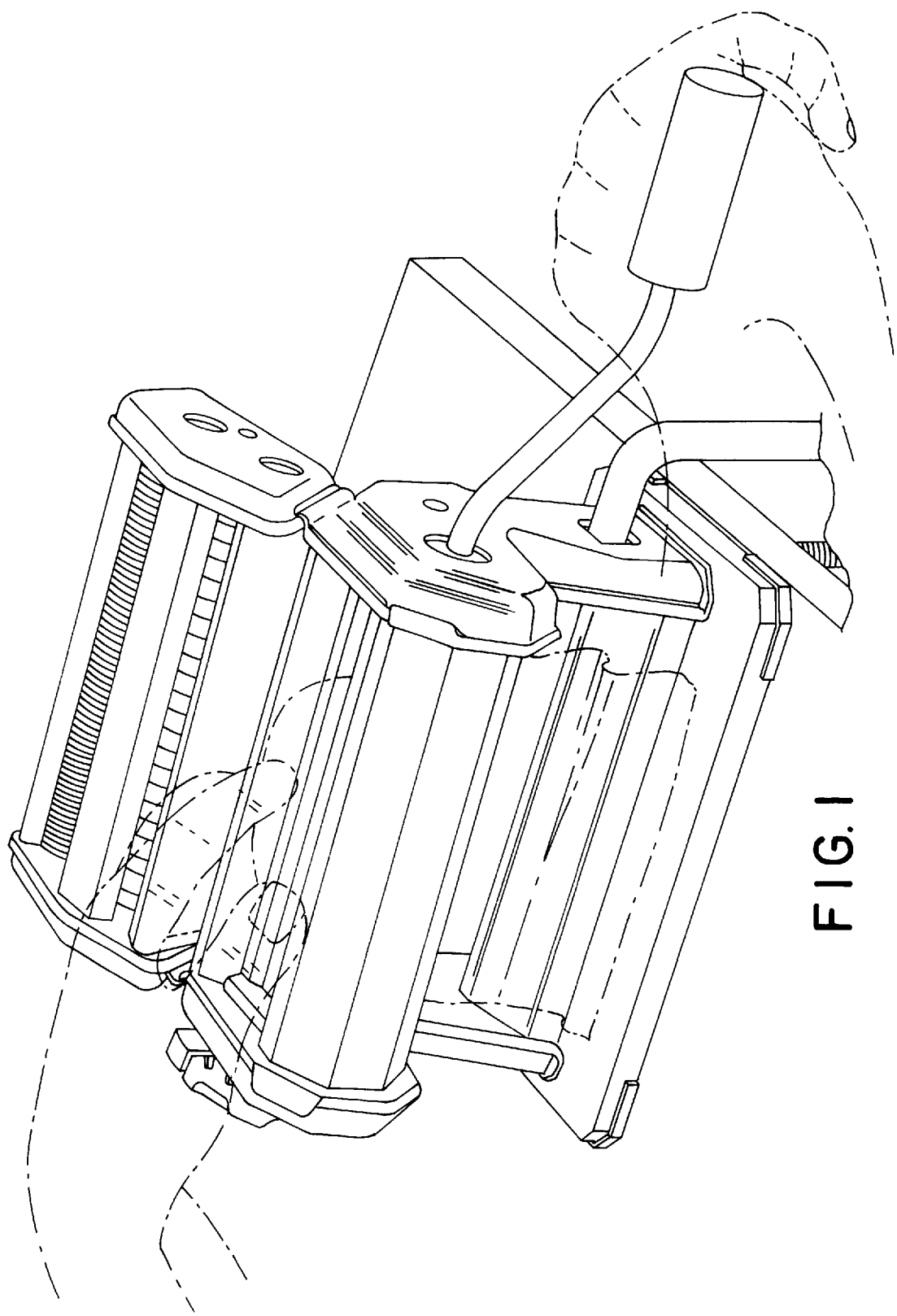
FIG. 1 shows in schematic perspective a conventional machine for domestic use for making, cutting and shaping pasta during the production of a sheet of pasta by an operator, through the introduction of the dough between the rollers of the shaping unit with one hand, and their simultaneous rotation with the other hand.
Figure 2:
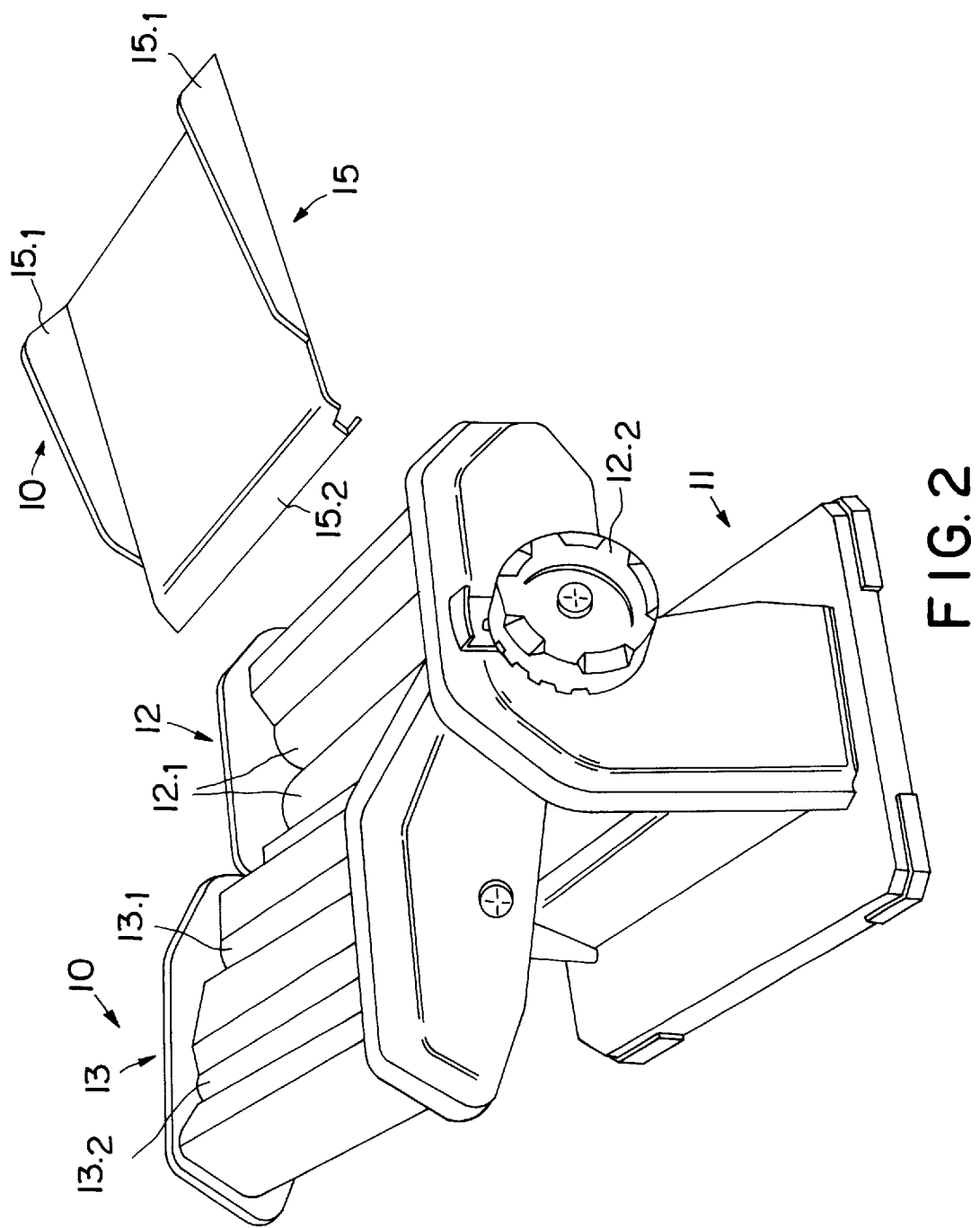
FIG. 2 shows in schematic perspective, with one part exploded, the machine for domestic use for making, cutting and shaping pasta, according to the present invention.
Figure 3:
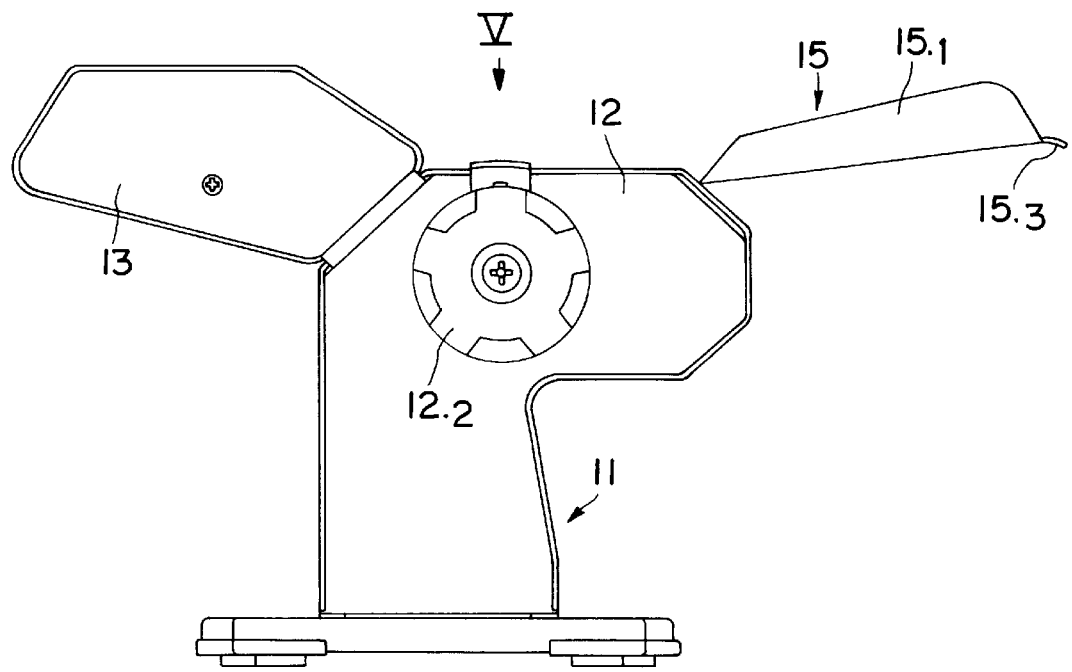
FIGS. 3 and 4 are views in lateral elevation, respectively of both sides of the machine according to FIG. 2.
Figure 4:
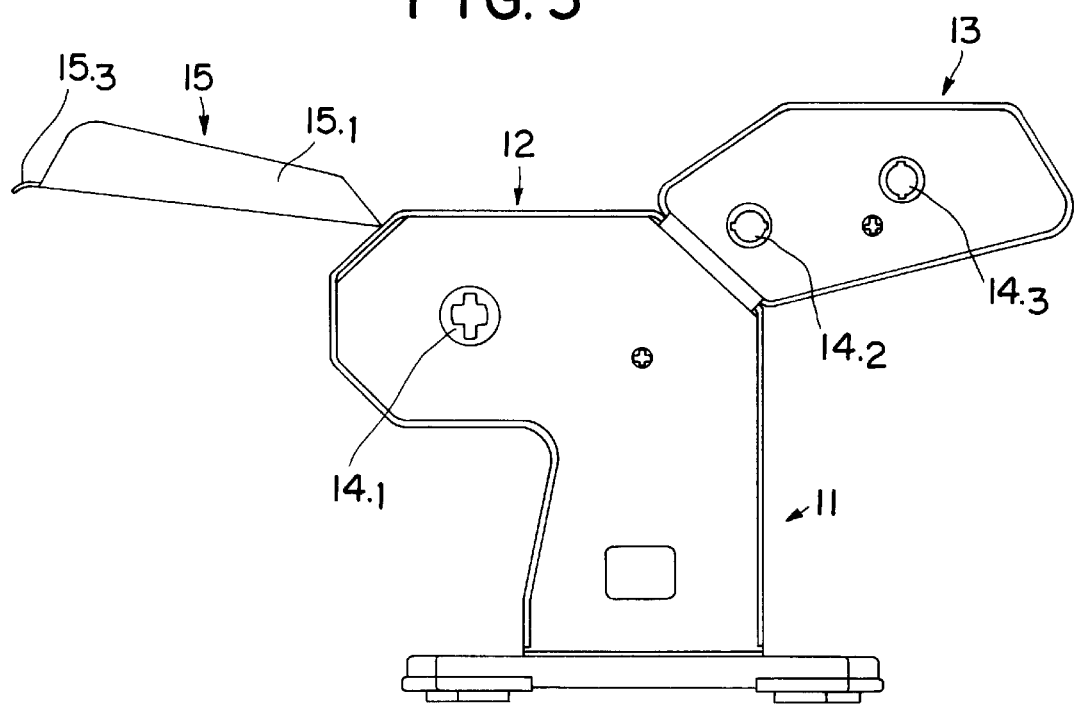
Figure 5:
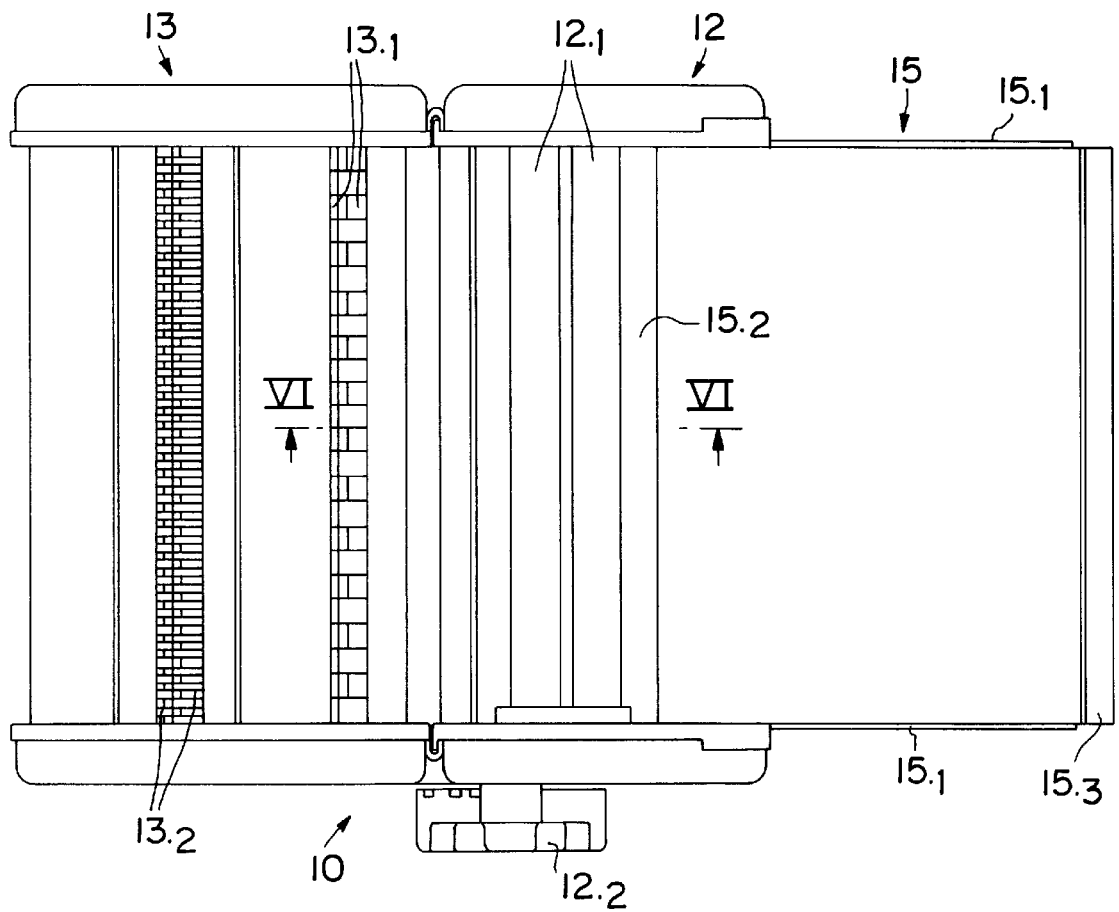
FIG. 5 is a plane view from above in the direction of arrow V in FIG. 3.
Figure 6:
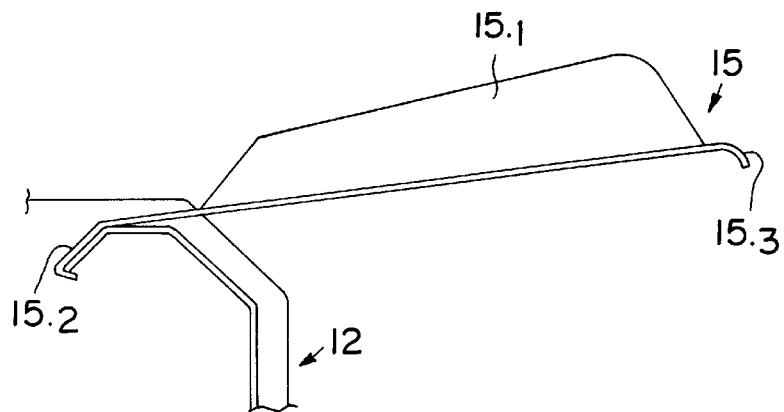
FIG. 6 is a detailed view in partial section and on a larger scale along the line VI—VI in FIG. 5.

In addition, the rollers 13.1 and 13.2, either of which can be used, are operated manually to rotate as a pair and in opposite directions by the handle 14, inserted in their respective releasable coupling seats 14.2 and 14.3 (FIG. 4).

According to the present invention, a hopper 15 is detachably fastened to one or the other unit head 12 or 13 to feed into the pair of rollers 12.1, 13.1 or 13.2 controlled in rotation, some dough made of flour and eggs or a sheet of pasta by means of this hopper, this being without the operator's manual intervention after the introduction of the dough or sheet between the rollers that process as they rotate. (In FIGS. 2 through 7 of the drawings, the hopper 15 is illustrated by way of example as it applies to the shaping unit 12).

The hopper 15 is laminate and is made, for example, of metal plate, and has two lateral guide strips 15.1.

In the extreme anterior area 15.2, the hopper 15 has a transverse edge folded downwards, substantially forming an "L" (FIG. 6), meeting a corresponding part of the internal edge of the shaping unit 12, with respect to which the laminate hopper is thus supported as an overhang.

In its extreme posterior portion, the hopper 15 presents a free transverse edge 15.3 extending beyond the guide strips 15.1 and bent downwards to favor the placement of the pasta on the hopper, avoiding sharp edges.

As clearly appears in FIG. 7, the machine 10 according to the present invention allows the operator, who with one hand turns the handle 14 causing the shaping rollers 12.1, for example, of the shaping unit 12 to roll, and with the other hand receives and gently places on a convenient support (not illustrated) the sheet S formed between the rollers, with the help of the hopper 15, on which the dough I is placed and through which it is fed to be processed in that unit.

Naturally, the effects of the present design are extended to designs which achieve similar usefulness, using the same innovative concept.

I claim:

1. A machine for domestic use for making, cutting or shaping pasta comprising:

at least one unit head for making, cutting or shaping pasta, said unit head having at least one pair of rollers having horizontal and parallel axes, said rollers being disposed adjacent to each other and rotatable around said horizontal and parallel axes, thereby forming an area for processing dough to form a sheet;

said unit head further comprising a hopper to feed the dough or pasta between said rollers, whereby the dough may be processed without manual intervention of the operator after introduction of the dough or sheet between said rollers.

2. A machine as defined in claim 1, wherein the hopper is laminate and has two lateral guide strips.

3. A machine as defined in claim 1, wherein the hopper has an end having an edge which bends downward, in the form of an "L" to meet and internal edge of the unit head, said hopper being supported as an overhang.

4. A machine as defined in claim 1, wherein the hopper is detachably fastened to the unit head.

5. A machine as defined in claim 2, wherein the hopper has a free edge extending beyond said guide strips and folded downwards, whereby placement of the dough or sheet on said hopper is facilitated.

* * * * *